Dec. 15, 1936.   C. B. SPASE   2,064,500
CLUTCH CONSTRUCTION
Filed Sept. 30, 1935
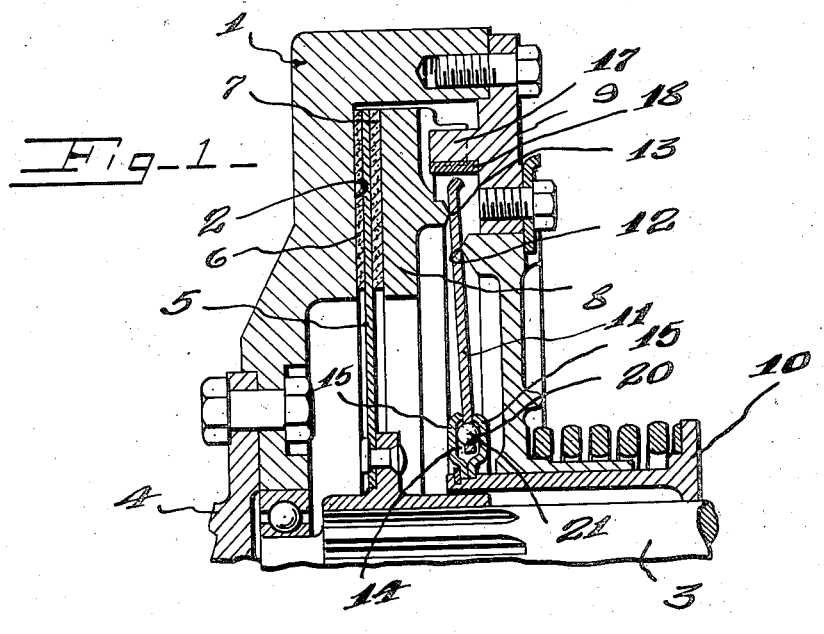
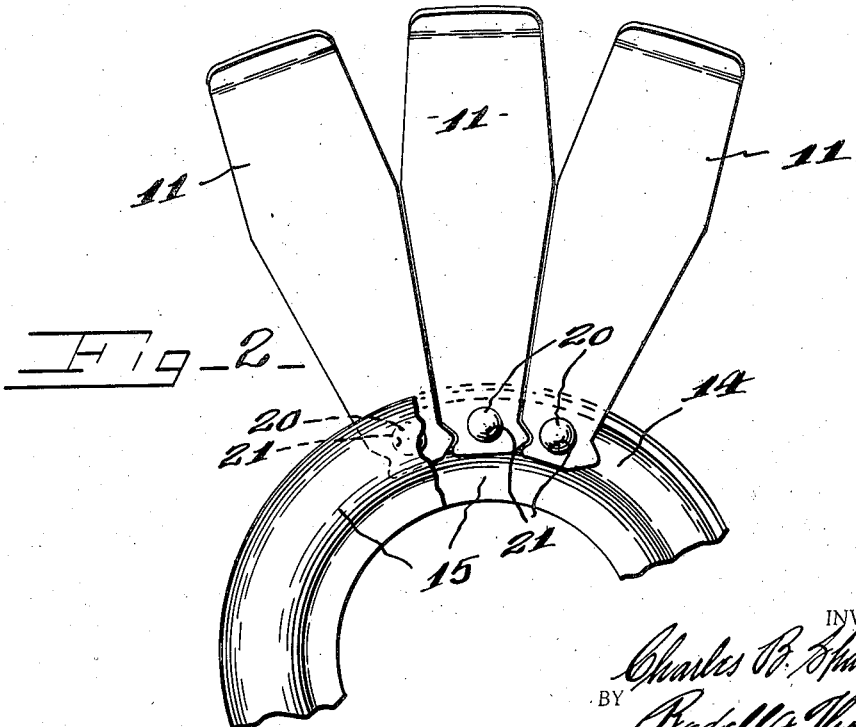
INVENTOR.
Charles B. Spase
BY Bordell & Thompson
ATTORNEYS.

Patented Dec. 15, 1936

2,064,500

UNITED STATES PATENT OFFICE 2,064,500

CLUTCH CONSTRUCTION

Charles B. Spase, Nedrow, N. Y., assignor to W. C. Lipe Inc., Syracuse, N. Y., a corporation of New York Application September 30, 1935, Serial No. 42,737

3 Claims. (Cl. 192—68)

This invention relates to clutches, such as are used in motor vehicles, and more particularly to clutches which include a series of floating levers or so-called clutch levers between the throw-out sleeve or collar, and a pressure ring and back plate, which levers are slidably mounted and slidably fulcrum on the pressure ring and the back plate, and consequently having a slight radial movement; and has for its object a particularly simple, efficient and economical means for holding the slidably mounted or floating levers from undue radial displacement, which means is located within the length of each lever in contradistinction to beyond the extreme outer end thereof, and also, preferably, said means located within the annular channel in the throw-out sleeve or collar in which the inner ends of the levers extend.

It further has for its object a means located near the extreme inner ends of the levers in the channel and including projections, preferably spherically curved projections on opposite sides of the levers for snugly engaging the opposing walls of the channel.

It further has for its object such a means which includes a ball at the inner end of each lever located in a perforation in the lever, the ball projecting on opposite sides of the lever and being clamped between the walls of the groove, so that the lever has a slight pivotal movement but is held from radial displacement. The ball also provides a slight universal joint movement to permit without binding or straining anything, a slight movement of the levers under the centrifugal force, as well as a forward and rearward tilting movement.

Heretofore, in this type of clutch with floating clutch levers, the outer ends of the levers have thrust against an annular abutment on the back plate, and in some clutches, under certain conditions, fulcrum thereon as when the clutch is thrown out with the engine running. In some uses of this type of clutch, the ends of the levers dig into the abutment to such an extent that the levers stick and the clutch can not be thrown out. One of these conditions is where the clutch is used on a comparatively high speed engine which is carrying a heavy load, and the clutch thrown out frequently in making gear shifts and the engine reved up to a high speed, when starting in low gear and again when getting from second into high. This condition develops in school buses where frequent stops are made and the high speed engine is constantly being reved up to maximum. The high speed causes the outer ends of the levers to dig into the annular abutment ring above referred to and the clutch rendered vitally defective.

This invention includes a simple and effective means for preventing such a defect from developing.

In describing this invention, reference is had to the accompanying drawing in which like characters designate corresponding parts in all the views.

Figure 1 is a fragmentary radial sectional view through a clutch embodying my invention.

Figure 2 is a fragmentary elevation showing the connection between the inner ends of the clutch levers and the wall of the groove in which they are seated.

1 designates the fly wheel of an internal combustion engine of a motor vehicle, this being formed with a recess, the bottom 2 of which forms a friction clutch face.

3 is the clutch shaft having a pilot bearing in the fly wheel 1 or crank shaft 4. 5 is a clutch disk mounted on the clutch shaft and having friction faces or rings 6, 7 on opposite sides thereof.

8 is a pressure ring.

9 is the back plate structure closing the rear end of the recess 2.

10 is the throw-out sleeve shiftable axially of the shaft 3.

11 are the clutch levers which slidably fulcrum at 12 and 13 on the back plate structure and on the pressure ring and which have their inner ends extended into an annular channel 14 provided on the throw-out sleeve or collar 10. This channel is provided between two opposing rings 15 shaped to form a contracted entrance for the channel, the rings being secured on the throw-out sleeve in any well known manner. The levers 11 slidably engage their fulcrums and have an outward throw that tends to displace them. Heretofore, this outward throw has been limited by the outer ends of the levers engaging an annular abutment 17 usually provided on the back plate structure and the face of this abutment may be provided with a hardened ring or spring insert 18 against which the ends of the levers thrust. However, as before pointed out, in certain installations used under certain conditions, the levers 11 dig into the abutment 17 to such an extent that the clutch becomes inoperative.

The feature of this invention is a simple means for limiting the radial movement before the ends of the levers engage the abutment 18 or a simple means by which the abutment 17 may be omitted.

As here illustrated, the limiting means is located between the extreme ends of the levers or within the length of each lever, and that here shown, comprises a ball 20 located in a perforation 21 at the inner end of each lever and in the channel 14, the ball snugly fitting between the walls of the channel 14, that is, it is clamped between the rings 15. The perforation 21 at the inner end of each lever is about .004 inch larger than the ball.

The contracted entrance of the channel 14 is wide enough to permit the forward and rearward play of the levers. The ball projects beyond the opposite faces of the levers and thereby provides projections on opposite faces of the levers, the tops of the projections snugly engaging the rings 15.

In operation, as the speed of the engine increases, the levers 11 do not throw outwardly far enough to engage their outer ends with the abutment 17, if an abutment is provided, but, on the contrary, the outward throw is prevented by the fact that the levers are mounted at their inner ends on the balls 20 and even though the balls might have some movement radially, any outward movement is limited by the balls engaging the contracted entrance of the channel 14. However, the rings 15 are intended to be clamped on the ball to hold them from any shifting or rolling movement. The levers during their back and forth movement thus have pivotal movement about the ball and also may have a slight circumferential movement or tendency to move circumferentially under the centrifugal force. However, there are no pins, pivots, etc., to be weakened by the action of the levers under the centrifugal force.

What I claim is:—

1. In a clutch, a driving section, a clutch shaft, a friction disk mounted thereon, a pressure ring, a back plate structure, a throw-out sleeve and a series of levers extending outwardly from the throw-out sleeve and slidably engaging fulcrums on the pressure ring and the back plate structure, the pressure ring, back plate structure, throw-out sleeve and levers being rotatable as a unit with the driving section, and the throw-out sleeve being formed with an annular channel into which the inner ends of the levers extend; the combination of means for holding the levers from radial displacement, said means being located at the inner ends of the levers and within the channel and including projections on the front and rear sides of the inner ends of the levers and within the channel, the tops of the projections engaging opposite walls of the channel, the channel having a contracted entrance through which the levers extend.

2. In a clutch, a driving section, a clutch shaft, a friction disk mounted thereon, a pressure ring, a back plate structure, a throw-out sleeve and a series of levers extending outwardly from the throw-out sleeve and slidably engaging fulcrums on the pressure ring and the back plate structure, the pressure ring, back plate structure, throw-out sleeve and levers being rotatable as a unit with the driving section, the throw-out sleeve being formed with an annular channel into which the inner ends of the levers extend; the combination of means for holding the levers from radial displacement, said means including a ball on the inner end of each lever and projecting beyond the front and rear face thereof providing projections, the ball snugly engaging the opposite walls of the channel and each lever being provided with an opening for receiving the ball, the channel having a contracted entrance through which the levers extend.

3. In a clutch including the usual pressure ring, back plate and throw-out sleeve formed with an annular channel and clutch levers extending at their inner ends into the channel, said levers slidably engaging fulcrums on the back plate and the pressure ring, the combination of means for holding the levers from radial displacement, said means including balls at the inner ends of the levers and interlocking therewith, the balls projecting beyond the front and rear faces of the levers providing projections, the balls snugly engaging the opposite walls of the channel and the levers being provided with openings for receiving the balls, the channel having a contracted entrance through which the levers extend.

CHARLES B. SPASE.